(12) United States Patent
Kostamovaara

(10) Patent No.: US 8,625,081 B2
(45) Date of Patent: Jan. 7, 2014

(54) METHOD AND DEVICE FOR MEASURING DISTANCE

(75) Inventor: Juha Kostamovaara, Oulu (FI)

(73) Assignee: Oulun yliopisto, Oulu (FI)

( * ) Notice: Subject to any disclaimer, the term of this patent is extended or adjusted under 35 U.S.C. 154(b) by 332 days.

(21) Appl. No.: 12/999,550

(22) PCT Filed: Jun. 17, 2009

(86) PCT No.: PCT/FI2009/050529
§ 371 (c)(1),
(2), (4) Date: Apr. 7, 2011

(87) PCT Pub. No.: WO2009/156580
PCT Pub. Date: Dec. 30, 2009

(65) Prior Publication Data
US 2012/0069322 A1    Mar. 22, 2012

(30) Foreign Application Priority Data

Jun. 27, 2008  (FI) .................................. 20085665

(51) Int. Cl.
*G01C 3/08* (2006.01)
(52) U.S. Cl.
USPC .......... 356/5.01; 356/609; 356/4.01; 358/1.9; 386/307
(58) Field of Classification Search
USPC .......... 356/4.01, 5.01, 609; 386/307; 358/1.9
See application file for complete search history.

(56) References Cited

U.S. PATENT DOCUMENTS

| 4,263,508 A | * | 4/1981 | Leary et al. ............. 250/358.1 |
| 4,530,600 A | | 7/1985 | Lopez |
| 5,303,020 A | | 4/1994 | Croteau |
| 5,663,731 A | | 9/1997 | Theodoras, II et al. |
| 6,493,653 B1 | | 12/2002 | Drinkard et al. |

(Continued)

FOREIGN PATENT DOCUMENTS

| FR | 2 887 342 | 12/2006 |
| WO | WO 99/31516 | 6/1999 |
| WO | WO 03/069779 A1 | 8/2003 |
| WO | WO 2008/009387 A1 | 1/2008 |

OTHER PUBLICATIONS

European Search Report for European Application No. 09769423, date of mailing Jan. 13, 2012.

(Continued)

*Primary Examiner* — Isam Alsomiri
*Assistant Examiner* — Samantha K Abraham
(74) *Attorney, Agent, or Firm* — Hamilton, Brook, Smith & Reynolds, P.C.

(57) ABSTRACT

There is provided an apparatus (300) for measuring a distance to a target (312), comprising: a transmitter (302) configured to transmit an optical pulse (310) towards the target (312), a receiver channel (304) configured to receive the optical pulse (310) reflected from the target (312), and a processor (306) configured to measure a time interval between the transmission and detection of the optical pulse (310) at a predefined amplitude threshold level (110A, 110B), to determine a time domain parameter from the detected optical pulse (310) at one or more amplitude threshold levels (110A, 110B), to convert the time domain parameter value into a correction value by a conversion model; to correct a timing error in the measured time interval by the correction value, and to convert the error-corrected time interval into a distance to the target (312).

11 Claims, 3 Drawing Sheets

(56) References Cited

U.S. PATENT DOCUMENTS

| | | |
|---|---|---|
| 6,587,185 B1 | 7/2003 | Ide et al. |
| 6,876,392 B1 | 4/2005 | Uomori et al. |
| 2005/0094238 A1 | 5/2005 | Kostamovaara et al. |
| 2005/0146705 A1 | 7/2005 | Lei et al. |
| 2008/0030398 A1 | 2/2008 | Nakamura |

OTHER PUBLICATIONS

Nissinen, J., et al., "Integrated Receiver Including Both Receiver Channel and TDC for a Pulsed Time-of-Flight Laser Rangefinder With cm-Level Accuracy," IEEE Journal of Solid-State Circuits, vol. 44, No. 5, pp. 1486-1497, May 2009.

J. Nissinen and J. Kostamovaara, "An Integrated Laser Radar Receiver Channel with Wide Dynamic Range," 14th IEEE International Conference on Electronics, Circuits and Systems, (2007) 4 pages.

Search Report for Finnish Application 20085665, dated Jan. 27, 2009 (1 page).

International Preliminary Report on Patentability for PCT/FI2009/050529, date of mailing Oct. 21, 2010.

Pehkonen, J., et al., "Receiver Channel With Resonance-Based Timing Detection For a Laser Range Finder," *IEEE Transactions on Circuits and Systems 1*: Regular Papers, vol. 53, Issue 3, pp. 569-577, Mar. 2006.

Palojarvi, P., et al., "A 250-MHz BICMOS Receiver Channel With Leading Edge Timing Discriminator For a Pulsed Time-Of-Flight Laser Rangefinder," *IEEE Journal of Solid-State Circuits*, vol. 40, Issue 6, pp. 1341-1349, ISSN 0018-9200, Jun. 2005.

Ruotsalainen, T., et al., "A Wide Dynamic Range Receiver Channel For a Pulsed Time-Of-Flight Laser Radar," IEEE Journal of Solid-State Circuits, vol. 36, No. 8, pp. 1228-1238, Aug. 2001.

\* cited by examiner

METHOD AND DEVICE FOR MEASURING DISTANCE

RELATED APPLICATIONS

This application is the U.S. National Stage of International Application No. of PCT/FI2009/050529, filed Jun. 17, 2009, which designates the U.S., published in English, and claims priority under 35 U.S.C. §§119 or 365(c) to Finland Application No. 20085665, filed Jun. 27, 2008.

FIELD

The invention relates generally to distance measuring. More particularly, the invention relates to a method and a device for measuring a distance on the basis of a time-of-flight of a pulsed laser signal.

BACKGROUND

Pulsed time-of-flight laser distance measuring is based on measuring the time it takes a transmitted optical pulse to travel to a detector. That is, the transmitted optical pulse is reflected from a target back to the device that transmitted the optical pulse, the detector of the device receives the optical pulse and measures the time between the transmission and the detection of the optical pulse. Since the velocity of light is known, the measured time can be converted to a distance between the device and the target.

However, this type of measuring technique with a leading edge timing discriminator has a few drawbacks. The amplitude of the reflected optical pulse may vary significantly, depending on the distance, the orientation, the smoothness of the surface and the reflection coefficient of the target. FIG. 1 shows that the amplitude of a first detected pulse 102A may be different from the amplitude of a second detected pulse 102B. By means of a fixed threshold level 110, the pulses 102A, 102B may be detected to have arrived at different times, even though the distance to the target from which the detected pulses 102A, 102B were reflected, may be the same. The difference in detection times causes a timing error, which is also called a walk error 120 of the distance measurement. The walk error 120 may lead the measured distance to vary even a few tens of centimeters, which may be too much in many applications.

There are several techniques that try to mitigate the varying amplitude error (walk error). These include, for example, an automatic gain control (AGC) circuit as described in Ruotsalainen, T.; Palojärvi, P. and Kostamovaara, J. "A Wide Dynamic Range Receiver Channel for a Pulsed Time-of-Flight Laser Radar", IEEE journal of solid-state circuits, August 2001, Vol. 36, No. 8, pages 1228-1238. An AGC circuit adjusts the amplitude of the received signal such that the amplitude is constant. The problem with AGC is that it only works with a certain dynamic range and is relatively slow. A unipolar-to-bipolar converter, as presented in Pehkonen, J.; Palojarvi, P. and Kostamovaara, J. "Receiver channel with resonance-based timing detection for a laser range finder", IEEE Transactions on Circuits and Systems I: Regular Papers, March 2006, Vol. 53, Issue 3, Pages: 569-577, may be used to generate a bipolar output signal from a unipolar input signal at a receiver. The zero-crossing point may be used to detect the edge of the received pulse. However, with certain signal levels, the detection error may be significantly large due to distortions in the generation of the bipolar signal at the receiver. A peak detector, such as the one presented in Palojarvi, P.; Ruotsalainen, T. and Kostamovaara, J. "A 250-MHz BiCMOS receiver channel with leading edge timing discriminator for a pulsed time-of-flight laser rangefinder", IEEE Journal of Solid-State Circuits, June 2005, Vol. 40, Issue 6, pages 1341-1349, ISSN 0018-9200, may be used to measure the maximum amplitude of the received signal and, consequently, the timing error can be measured as a function of the peak amplitude and the function may be used in measurement to compensate the for timing error. However, when the received signal is saturated, the peak detecting or the unipolar-to-bipolar converting techniques clearly cannot be applied.

Since the existing solutions for correcting or eliminating the timing error do not serve well, new solutions are needed.

BRIEF DESCRIPTION OF THE INVENTION

An object of the invention is to provide a method and an apparatus for measuring a distance. Furthermore, a method of modeling a correction to a timing error is provided.

According to an aspect of the invention, there is provided a method as specified in claims 1 and 4.

According to an aspect of the invention, there is provided an apparatus as specified in claim 8.

Embodiments of the invention are disclosed in the dependent claims.

LIST OF DRAWINGS

In the following, the invention will be described in greater detail with reference to the embodiments and the accompanying drawings, in which FIG. 1 presents a walk error generated by a varying amplitude of detected optical pulses (PRIOR ART);

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In an ideal case, a receiver channel of a measurement device would always give exactly the correct distance to a target. However, in reality this is not the case. Generally the concept of timing error has been considered to involve a walk error 120 generated by the varying amplitude among the detected optical pulses 102A, 102B, as explained in the prior art section. However, the walk error 120 may not be the only error that occurs in the distance measurement. A significant timing error that affects the accuracy of the distance measurement may be an error caused by an electric circuit of the receiver channel of the measurement device. However, in the prior art solutions this error has been neglected.

The maximum value of an error caused by the finite bandwidth of the electric circuit of the receiver channel may be equal to the time constant $\tau$ of the electric circuit. The time constant $\tau$ is related to the bandwidth B of the electric circuit according to $\tau=1/(2\pi B)$. The value of the error caused by the electric circuit varies such that the maximum value is equal to the time constant $\tau$ of the circuit, i.e., between 0 and $\tau$ seconds.

Figure 1:
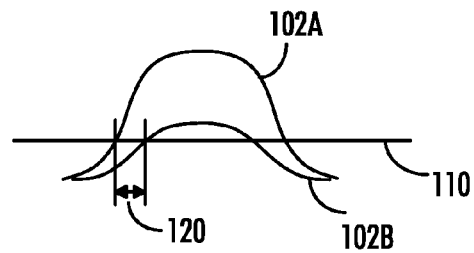
Figure 2:
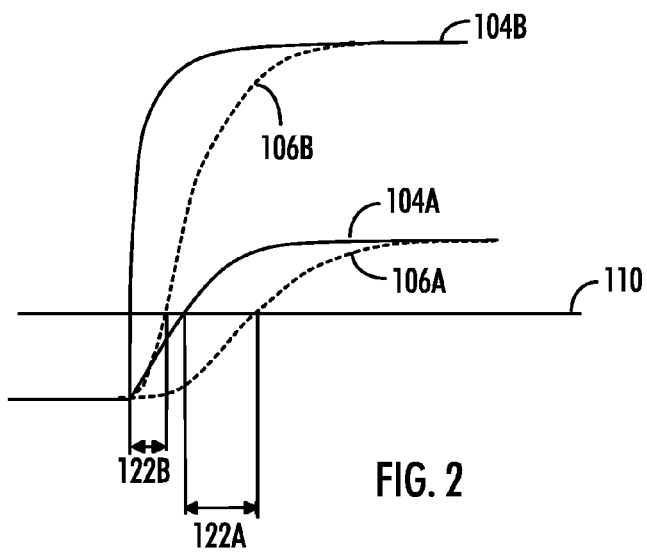
FIG. 2 shows an error generated by electronics in a receiver.

As shown in FIG. 2, a timing error 122A relative to the time constant $\tau$ of the electric circuit of the receiver channel may be caused to a pulse 106A detected from a transmitted optical pulse 104A after being reflected from the target. In other words, it may take the detected pulse 106A $\tau$ seconds to reach the threshold level 110. The maximum value of the error caused by the electric circuit may occur when the amplitude of the transmitted signal 104A is at minimum. The transmitted optical pulse 104A may also suffer from finite rise time (slew rate) as shown in FIG. 2. However, when the amplitude of the transmitted signal 104B is large, the error 122B may be smaller than t, as shown in FIG. 2. That is, the time it takes the detected pulse 106B to reach the threshold level 110 may be smaller than t. With an infinitely large amplitude, the error 122B would be 0 seconds.

Thus, according to an embodiment of the invention, the timing error may include an error 120 generated by a varying amplitude of the detected optical pulse and an error 122A, 122B generated by a time constant of an electric circuit of the receiver channel.

Figure 3:
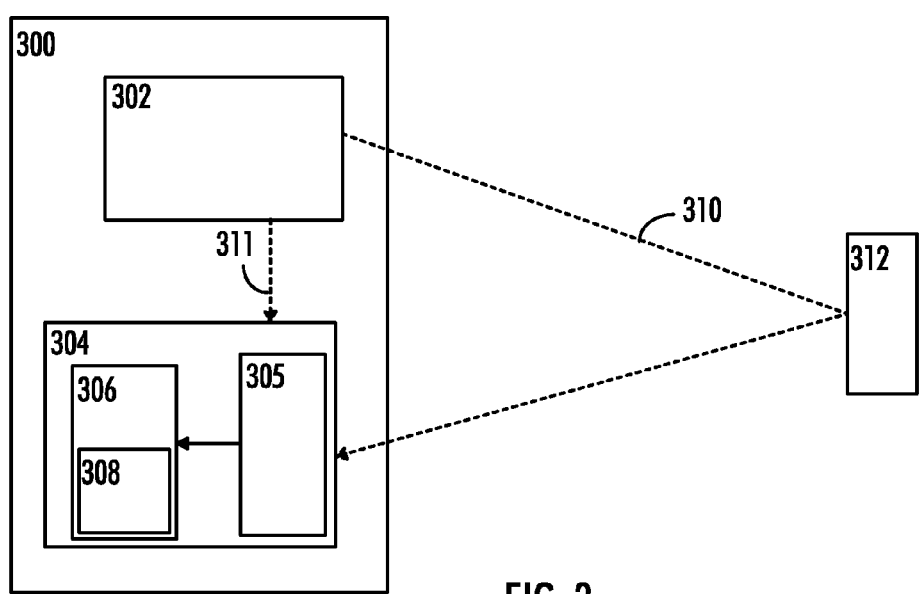
FIG. 3 shows a block diagram of an apparatus according to an embodiment of the invention.

In FIG. 3, a block diagram of an apparatus 300 for measuring a distance to a target 312 is shown. The apparatus 300 may be, for example, a pulsed laser distance measuring device or any apparatus capable of measuring a distance by transmitting and receiving optical pulses. In FIG. 3, only the logical elements required for understanding the structure of the apparatus 300 are shown. Other components or elements have been omitted for reasons of simplicity. It is apparent to a person skilled in the art that the apparatus 300 for measuring a distance to the target 312 may also comprise other functions, components and structures. Moreover, the connections shown with solid lines in FIG. 3 are logical connections, and the actual physical connections may be different.

The apparatus 300 may comprise a transmitter 302 that may transmit an optical pulse 310 towards the target 312, a receiver channel 304 that may receive the optical pulse 310 reflected from the target 312, and a processor 306 that may measure a time interval between the transmission and detection of the optical pulse 310 at a predefined amplitude threshold level. The processor 306 may further determine a time domain parameter from the detected optical pulse 310 at one or more amplitude threshold levels, convert the time domain parameter value into a correction value by a conversion model, correct a timing error in the measured time interval by the correction value, and convert the error-corrected time interval into a distance to the target 312.

The optical pulse 310 transmitted from the transmitter 302 is shown in a dotted line. The transmitter 302 and the receiver channel 304 may be connected such that the optical pulse 310 transmitted towards the target 312 may be simultaneously transmitted to the receiver channel 304 as well. The optical pulse 310 may be transmitted to the receiver channel 304 via a lens or a prism that directs part of the optical pulse 310 transmitted towards the target 312 to the receiver channel 304 as a reference pulse 311, or the transmitter 302 may directly transmit another pulse to the receiver channel 304 as the reference pulse 311.

The transmitter 302 may transmit a plurality of optical pulses with a certain frequency. Each pulse may last, for example, 5 nanoseconds.

The receiver channel may comprise a detector 305 that may detect the reference pulse 311 and the optical pulse 310 reflected from the target 312. The target 312 may be any object that reflects at least part of the optical pulse 310 back in the direction of the apparatus 300. The detector 305 may detect the optical pulse 310 at a predetermined threshold level with respect to the pulse amplitude. That is, when the receiver channel 304 receives the optical pulse 310 reflected from the target 312, the time of the arrival of the optical pulse 310 may be the time when the detector 305 detects it. In other words, the time of the arrival of the optical pulse 310 may be the time instant at which the pulse amplitude is higher than the predetermined threshold. The threshold may be any threshold chosen such that the amount of false detections is low enough for the current application. Similarly, the time of the transmission of the optical pulse 310 by the transmitter 302 may be detected at the predefined amplitude threshold by the detector 305 from the reference pulse 311 received by the receiver channel 304.

As explained, the apparatus 300 may comprise the processor 306 for measuring the time interval between the transmission and the detection of the optical pulse 310 at the predefined amplitude threshold level. The detector 305 and the processor 306 may be connected such that the detector 305 may inform the processor 306 about the arrival times of the pulses 310, 311.

The processor 306 may be implemented by a digital signal processor provided with suitable software embedded on a computer readable medium, or by separate logic circuits, for example with an application specific integrated circuit (ASIC). The processor 306 may comprise an input/output (I/O) interface, such as a computer port for providing communication capabilities.

Figure 4:
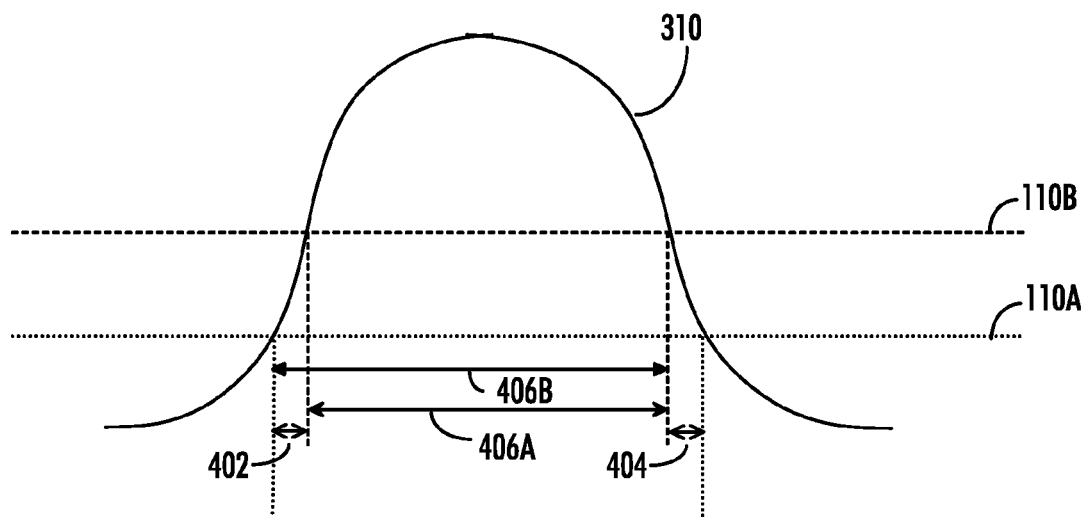
FIG. 4 illustrates various ways to determine a time domain parameter, according to an embodiment of the invention.

As explained, the processor 306 may further determine a time domain parameter from the detected optical pulse 310 at one or more amplitude threshold levels. FIG. 4 illustrates various ways to determine a time domain parameter. The time domain parameter may be determined by applying at least one of the following: a rise time 402 of the detected optical pulse 310 between at least two threshold levels 110A, 110B, a fall time 404 of the detected optical pulse 310 between at least two threshold levels 110A, 110B, a width 406A, 406B of the detected optical pulse 310 in time domain.

In an embodiment, the width 406A may be determined at a predetermined threshold level 110B, the threshold level 1108 being the same on each side of the optical pulse 310. Alternatively, in an embodiment, the width 406B may be determined by using two different threshold levels 110A, 110B, one on each side of the optical pulse 310, as shown in FIG. 4. Thus, the width 406A, 406B of the detected optical pulse 310 may be determined by applying two threshold levels 110A, 110B, one threshold level at a first side of the detected optical pulse 310 being different from or the same as the other threshold level at a second side of the detected optical pulse 310. In other words, the width 406A of the detected optical pulse 310 may be determined by applying two threshold levels, one threshold level at a first side of the detected optical pulse 310 being the same as the other threshold level at a second side of the detected optical pulse 310. Alternatively, the width 406B of the detected optical pulse 310 may be determined by applying two threshold levels 110A, 1108, one threshold level at a first side of the detected optical pulse 310 being different from the other threshold level at a second side of the detected optical pulse 310. The threshold level, with respect to the amplitude of the detected pulse optical 310, at the second side of the detected optical pulse 310 may be higher or lower than the threshold level at the first side of the detected optical pulse 310. The first side of the detected optical pulse 310 may be, for example, the rise side of the optical pulse 310. Similarly, the second side of the detected optical pulse 310 may be the fall side of the optical pulse 310.

Further, the time domain parameter may be a combination of at least two of the rise time 402, the fall time 404, and the width 406A, 406B. In general, the time domain parameter may be any parameter that may be extracted from the received optical pulse 310 in time domain. Thus, the time domain parameter may not be determined by the slew rate of the optical pulse 310, but also the width 406A, 406B of the optical pulse 310 may be considered as the time domain parameter.

Figure 5:
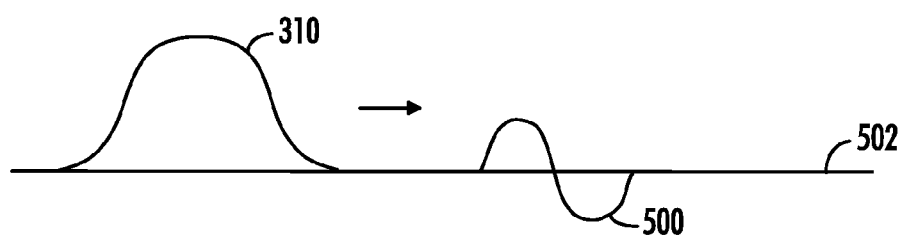
FIG. 5 illustrates a unipolar-to-bipolar pulse conversion, according to an embodiment of the invention.

According to an embodiment as shown in FIG. 5, the processor may further generate a bipolar optical pulse 500 from the received unipolar optical pulse 310 and apply the generated bipolar optical pulse 500 in the detection. The detection of the bipolar optical pulse 500 may occur when the bipolar optical pulse 500 crosses the zero amplitude level 502. Further, the detector may apply more than one threshold level to determining the time domain parameter of the bipolar optical pulse 500.

The processor 306 in FIG. 3 may further convert the time domain parameter value into the correction value by the conversion model. The correction value may be applied to correcting the time interval between the transmission and the detection of the optical pulse 310 by an arithmetic operation performed with the correction value and the time interval between the transmission and the detection of the optical pulse 310.

Figure 6:
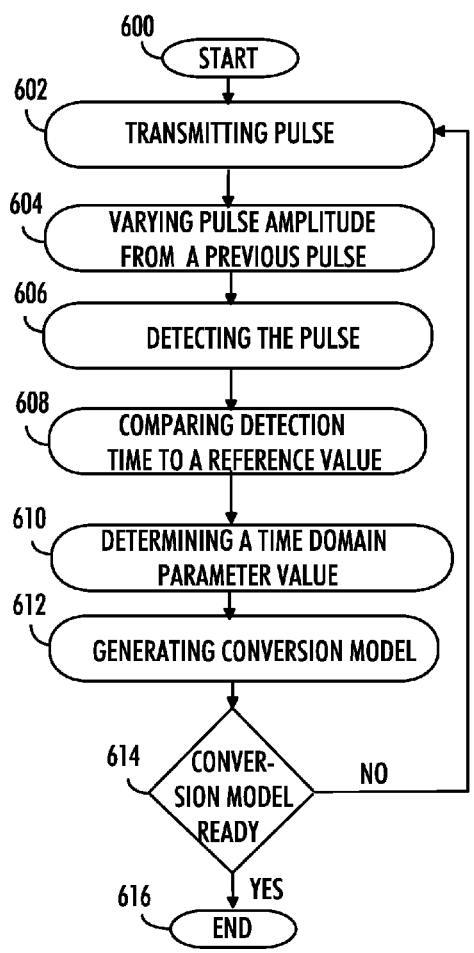
FIG. 6 illustrates a method of modeling a correction to a timing error.

The conversion model may be obtained by a method of modeling a correction to the timing error in the apparatus 300 for measuring the distance to the target 312, as shown in FIG. 6. The timing error may include an error generated by the varying amplitude of the detected optical pulse and an error generated by an electric circuit of the receiver channel. The processes of the method may be performed in a laboratory or in all other environment free of interference. The method begins in step 600.

In step 602, the method comprises transmitting at least one optical pulse from the transmitter. The at least one optical pulse may be transmitted directly to the receiver channel from a separate transmitter, or the transmitter and the receiver channel may be physically in the same apparatus. In such a case, the optical pulse may be transmitted towards the target, which may reflect the optical pulse back to the apparatus and, more particularly, to the receiver channel.

Step 604 comprises varying the amplitude of the optical pulses in a known manner. Transmitting pulses with different amplitudes or by forcing the optical pulse to travel through a user controllable element that may be configured to weaken or strengthen the pulse amplitude before arriving at the receiver channel may cause amplitude variation, for example.

In step 606, the at least one optical pulse may be detected by the receiver channel at a predetermined amplitude threshold level. More particularly, the detector of the receiver channel may perform the detection. The predefined amplitude threshold level may be any threshold. If the optical pulse is transformed into a bipolar optical pulse, the threshold level may be the zero threshold level. The detection of the optical pulse results in a detection time. The detection time may vary, depending on the amplitude of the optical pulse, and the amplitude of the optical pulse affects the rise time of the optical pulse, the fall time of the optical pulse, and the width of the optical pulse. Further, the detection time may depend on the distance between the transmitter and the receiver channel, or the distance between the apparatus, which comprises the transmitter and the receiver channel, and the target.

Step 608 of the method comprises determining a comparison result between the at least one detection time of the at least one optical pulse and a reference value. The reference value of the detection time may be arbitrarily selected, it may be predefined, or it may be based on a distance the optical pulse travels. Thus, the reference value may be the time it takes the optical pulse to travel between the target and the receiver channel, or it may be any arbitrary point in time. In other words, the correction modeling may be obtained without determining any actual distances. For example, the detection time of the first optical pulse may be considered as the reference value for the detection times of the adjacent optical pulses. Since the amplitudes of the adjacent optical pulses may vary, the detection times for the adjacent optical pulses may be different from the reference value. According to an embodiment, the difference between the reference value and the current detection time may be determined in the determination of the comparison result between the detection time and the reference value.

In step 610, the at least one time domain parameter value is determined from the at least one detected optical pulse at one or more threshold amplitude levels. Determining the time domain parameter may be performed by applying at least one of the following: a rise time of the detected optical pulse between at least two threshold levels, a fall time of the detected optical pulse between at least two threshold levels, a width of the detected optical pulse in time domain as shown in FIG. 4. Further, a combination of the rise time, the fall time, and the width may be applied.

As explained earlier, determining the width of the detected optical pulse may be obtained by applying two threshold levels, one threshold level at a first side of the detected optical pulse being different from or the same as the other threshold level at a second side of the detected optical pulse. Thus, in an embodiment, the width may be determined at a predetermined threshold level, the threshold level being the same on each side of the optical pulse. Alternatively, in an embodiment, the width may be determined by using two different threshold levels, one on each side of the optical pulse. In other words, determining the width of the detected optical pulse may be obtained by applying two threshold levels, one threshold level at a first side of the detected optical pulse being the same as the other threshold level at a second side of the detected optical pulse. Alternatively, determining the width of the detected optical pulse may be obtained by applying two threshold levels, one threshold level at a first side of the detected optical pulse being different from the other threshold level at a second side of the detected optical pulse.

Thus, for each detected optical pulse, a time domain parameter value and a detection time of the optical pulse together with the difference between the detection time and the reference value are determined. With a plurality of optical pulses detected, a large amount of statistical data may be obtained. The statistical data may be applied to the generation of the conversion model. Consequently, step 612 of the method comprises generating the conversion model by the at least one comparison result and the at least one time domain parameter, the conversion model being for converting a time domain parameter value into a correction value to be applied to correcting the timing error in the detection of an optical pulse.

The conversion model may be a conversion table or a conversion function. When the conversion model is a table, the table may comprise, for example, two columns: one column for the differences between the detection times of the optical pulses and the reference value in seconds and the other column for the time domain parameter values in seconds. In a certain row, the difference between the reference value and the detection time of the certain optical pulse may be shown together with the time domain parameter value of the same optical pulse. Consequently, during a measurement, the determined time domain parameter value of an optical pulse may be looked up in the table together with the corresponding correction value, and this correction value may be used to correct the timing error in the time interval between the transmission and the detection of the optical pulse. When the conversion model is a function, the function may be generated with a large amount of statistical information related to the comparison results between the detection times and the reference value, and the corresponding time domain parameter values.

Referring to FIG. 4, having a parameter in time domain instead of having a parameter with respect to the amplitude of the optical pulse 310 may enable several advantages. For instance, if the received optical pulse 310 is saturated, the amplitude parameter may not work properly. However, saturation of the pulse amplitude may cause no problems to the functionality of the time domain parameter. Moreover, in a misty measuring environment, the width 406A, 4068 of the optical pulse 310 may be spread. Having a time domain parameter with respect to the width 406A, 406B of the optical pulse 310 may enable a correct measuring result via an accurate correction, whereas a different parameter, such as an amplitude related parameter, may cause the measuring result to be erroneous. Similarly, a change in the angle of impact of the optical pulse 310 to the target 312 may cause the width 406A, 4068 of the received optical pulse 310 to vary significantly. This may be taken into account with the time domain parameter being used in correcting the measuring result.

The difference between the reference value and the detection time for a certain optical pulse may be the correction value applied in the actual measurement for a detected optical pulse with a time domain parameter value equal to a time domain parameter value of the same certain optical pulse. If, during measurement, a determined time domain parameter value is not equal to any of the time domain parameter values in the conversion model, for example in the conversion table, the values in the table may be interpolated to include more time domain parameter values and corresponding correction values.

In step 614, the method decides whether or not the conversion model is ready. If the model is ready, i.e. there is enough statistical information to create the conversion function, or the conversion table is comprehensive, the method continues in step 616, in which the method ends. However, if not enough statistical information is available, the method continues in step 602 by transmitting another set of optical pulses.

Referring to FIG. 3, the processor 306 may further comprise a memory 308. The processor 306 may store the conversion model in a memory 308.

The processor 306 may, thus, after converting the time domain parameter into the correction value, correct the timing error in the measured time interval by the correction value. The correction may be performed by an arithmetic operation. For example, subtracting the correction value from the measured time interval may perform the correction. After correcting the measured time interval, the processor 306 may convert the error-corrected time interval into a distance to the target 312 in meters.

The apparatus 300 may further comprise a display, such as a liquid crystal display, for enabling the apparatus 300 to show information to a viewer. The information may be, for example, the distance to the target 312 in meters.

Figure 7:
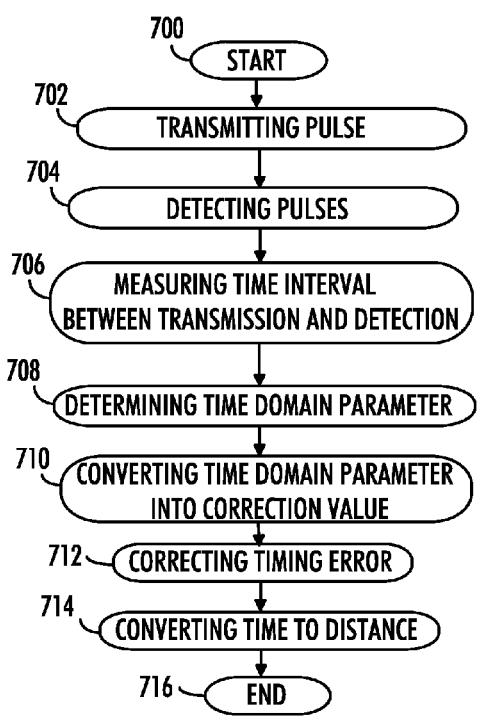
FIG. 7 illustrates a method of measuring a distance to a target.

FIG. 7 illustrates a method of measuring a distance to a target. The method begins in step 700.

In step 702, an optical pulse is transmitted from a transmitter towards the target. The transmitter may transmit a plurality of optical pulses at a certain frequency to enable a better accuracy with more statistical information about the distance.

Step 704 of the method comprises receiving, by a receiver channel, the optical pulse reflected from the target. In step 706, a time interval between the transmission and detection of the optical pulse at a predefined amplitude threshold level is measured. The time of the transmission may be obtained by the reference pulse 311 shown in FIG. 3.

In step 708 in FIG. 7, the method comprises determining a time domain parameter from the detected optical pulse at one or more amplitude threshold levels. Determining the time domain parameter may be performed by applying at least one of the following: a rise time of the detected optical pulse between at least two threshold levels, a fall time of the detected optical pulse between at least two threshold levels, a width of the detected optical pulse in time domain, as shown in FIG. 4. Alternatively, a combination of the above is feasible.

Further, the measurement of the time domain parameter may include measurement of the time between the transmission and the detection of the optical pulse at different threshold levels. However, this is not required. According to an embodiment, it will suffice to measure, for example, the time between the two threshold levels 110A and 110B.

Step 710 of the method comprises converting the determined time domain parameter value into a correction value by a conversion model. Step 710 may comprise, for example, performing the conversion on the basis of a conversion table or a conversion function. Thus, the conversion model may be a table or a function. Looking up the determined time domain parameter value in the table and selecting a corresponding correction value from the table may constitute the converting of the time domain parameter value into the correction value, for example. Further, the conversion model may be stored in the memory of the apparatus.

In step 712, a timing error in the measured time interval may be corrected by the correction value. This may be obtained by performing an arithmetic operation with the correction value and the measured time interval.

After correcting the measured time interval, the method may proceed in step 714 in which converting the error-corrected time interval into a distance to the target in meters may occur. The method ends in step 716.

In an embodiment, the apparatus may be applied to modeling the surface of a target. In such a case, the actual distance to the target may not be important, but the difference in the distances to the reference distance is.

Since the time domain parameter value changes according to the form of the optical pulse, which is affected by, for example, the surface characteristics of the target, the environment, the electronics of the measurement device, etc., the error in the measured time interval may be compensated for by the correction value resulting in an accurate distance measurement result.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method of modeling a correction to a timing error in an apparatus for measuring a distance to a target, comprising:
   transmitting at least one optical pulse from a transmitter;
   varying an amplitude of the optical pulses in a known manner in order to cause variations in detection times of the plurality of adjacent optical pulses; and
   detecting, by a receiver channel, the at least one optical pulse at a predetermined amplitude threshold level, wherein the detection takes place at a detection time;
   the method further comprising:
   determining a comparison result between the at least one detection time of the at least one optical pulse and a reference value, wherein the comparison result is based on a time difference between the reference value and the detection time;
   determining at least one time domain parameter value from the at least one detected optical pulse at one or more threshold amplitude levels; and
   generating a conversion model by the at least one comparison result and the at least one time domain parameter value, the conversion model being for converting the time domain parameter value into a correction value applied in correcting a timing error in a future detection of an optical pulse by the same apparatus, wherein the timing error includes:
   a first error generated by a varying amplitude of the to-be-detected optical pulse; and
   a second error generated by an electric circuit of the receiver channel of the apparatus, wherein the second error depends on a bandwidth of the electric circuit and on the amplitude of the transmitted optical pulse, and has a value between 0 and a time constant of the electric circuit depending on the amplitude of the transmitted optical pulse.

2. The method of claim 1, further comprising:
   determining the time domain parameter value by applying at least one of the following: a rise time of the detected optical pulse between at least two threshold levels, a fall time of the detected optical pulse between at least two threshold levels, a width of the detected optical pulse in the time domain.

3. The method of claim 2, further comprising:
   determining the width of the detected optical pulse by applying two threshold levels, one threshold level at a first side of the detected optical pulse being different from the other threshold level at a second side of the detected optical pulse.

4. A method of measuring a distance to a target by an apparatus, comprising:
   transmitting an optical pulse from a transmitter towards the target;
   receiving, by a receiver channel, the optical pulse reflected from the target; and
   measuring a time interval between the transmission and detection of the optical pulse at a predefined amplitude threshold level,
   the method further comprising:
   determining a time domain parameter value from the detected optical pulse at one or more amplitude threshold levels;
   converting the time domain parameter value into a correction value by a conversion model obtained by performing the following steps:
   transmitting at least one optical pulse from a transmitter;
   varying an amplitude of the optical pulses in a known manner in order to cause variations in detection times of the plurality of adjacent optical pulses;
   detecting, by a receiver channel, the at least one optical pulse at a predetermined amplitude threshold level, wherein the detection takes place at a detection time;
   determining a comparison result between the at least one detection time of the at least one optical pulse and a reference value, wherein the comparison result is based on a time difference between the reference value and the detection time;
   determining at least one time domain parameter value from the at least one detected optical pulse at one or more threshold amplitude levels; and
   generating the conversion model by the at least one comparison result and the at least one time domain parameter value, the conversion model being for converting the time domain parameter value into the correction value applied in correcting a timing error in a future detection of an optical pulse by the same apparatus,
   and wherein the method of measuring the distance to the target further comprises:
   correcting a timing error in the measured time interval by applying the correction value, the timing error including a first error generated by a varying amplitude of the detected optical pulse and a second error generated by an electric circuit of the receiver channel of the apparatus, wherein the second error depends on a bandwidth of the electric circuit and on the amplitude of the transmitted optical pulse, and has a value between 0 and a time constant of the electric circuit depending on the amplitude of the transmitted optical pulse;
   converting the error-corrected time interval into a distance to the target.

5. The method of claim 4, further comprising:
   determining the time domain parameter value by applying at least one of the following: a rise time of the detected optical pulse between at least two threshold levels, a fall time of the detected optical pulse between at least two threshold levels, a width of the detected optical pulse in the time domain.

6. The method of claim 5, further comprising:
   determining the width of the detected optical pulse by applying two threshold levels, one threshold level at a first side of the detected optical pulse being different from the other threshold level at a second side of the detected optical pulse.

7. The method of claim 4, further comprising:
   storing the conversion model in a memory.

8. An apparatus for measuring a distance to a target, comprising:
   a transmitter configured to transmit an optical pulse towards the target;
   a receiver channel configured to receive the optical pulse reflected from the target; and
   a processor configured to measure a time interval between the transmission and detection of the optical pulse at a predefined amplitude threshold level,
   wherein the processor is further configured to:
   determine a time domain parameter value from the detected optical pulse at one or more amplitude threshold levels;
   convert the time domain parameter value into a correction value by a conversion model obtained the same apparatus performing the following steps:
   transmitting at least one optical pulse from a transmitter;

varying an amplitude of the optical pulses in a known manner in order to cause variations in detection times of the plurality of adjacent optical pulses;

detecting, by a receiver channel, the at least one optical pulse at a predetermined amplitude threshold level, wherein the detection takes place at a detection time;

determining a comparison result between the at least one detection time of the at least one optical pulse and a reference value, wherein the comparison result is based on a time difference between the reference value and the detection time;

determining at least one time domain parameter value from the at least one detected optical pulse at one or more threshold amplitude levels; and generating the conversion model by the at least one comparison result and the at least one time domain parameter value, the conversion model being for converting the time domain parameter value into the correction value applied in correcting a timing error in a future detection of an optical pulse by the same apparatus, and wherein the processor is further configured to:

correct a timing error in the measured time interval by applying the correction value, the timing error including a first error generated by a varying amplitude of the detected optical pulse and a second error generated by an electric circuit of the receiver channel of the apparatus, wherein the second error depends on a bandwidth of the electric circuit and on the amplitude of the transmitted optical pulse, and has a value between 0 and a time constant of the electric circuit depending on the amplitude of the transmitted optical pulse; and convert the error-corrected time interval into a distance to the target.

9. The apparatus of claim 8, wherein the time domain parameter value is determined by applying at least one of the following: a rise time of the detected optical pulse between at least two threshold levels, a fall time of the detected optical pulse between at least two threshold levels, a width of the detected optical pulse in the time domain.

10. The apparatus of claim 9, wherein the width of the detected optical pulse is determined by applying two threshold levels, one threshold level at a first side of the detected optical pulse being different from the other threshold level at a second side of the detected optical pulse.

11. The apparatus of claim 8, wherein the processor is further configured to store the conversion model in a memory.

* * * * *

UNITED STATES PATENT AND TRADEMARK OFFICE
CERTIFICATE OF CORRECTION

PATENT NO. : 8,625,081 B2 Page 1 of 1
APPLICATION NO. : 12/999550
DATED : January 7, 2014
INVENTOR(S) : Juha Kostamovaara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this
Twenty-second Day of September, 2015

Michelle K. Lee
*Director of the United States Patent and Trademark Office*